US007195391B2

(12) United States Patent
Lin

(10) Patent No.: US 7,195,391 B2
(45) Date of Patent: Mar. 27, 2007

(54) BACKLIGHT MODULE WITH LIGHT GUIDE PLATE HAVING CONCAVE LIGHT INPUT SURFACE

(75) Inventor: Jyh Chain Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/286,121

(22) Filed: Nov. 22, 2005

(65) Prior Publication Data

US 2006/0077689 A1   Apr. 13, 2006

Related U.S. Application Data

(63) Continuation of application No. 10/731,043, filed on Dec. 8, 2003.

(30) Foreign Application Priority Data

Dec. 6, 2002   (TW) .............................. 91219755 U

(51) Int. Cl.
*F21V 7/04*   (2006.01)
(52) U.S. Cl. ........................ 362/621; 362/612; 362/628
(58) Field of Classification Search ........ 362/612–613, 362/621, 628, 615; 349/65, 68
See application file for complete search history.

(56) References Cited

U.S. PATENT DOCUMENTS 6,139,163 A * 10/2000 Satoh et al. ................. 362/612
6,191,833 B1 * 2/2001 Hirakata ....................... 349/61
6,561,660 B2 * 5/2003 Huang .......................... 362/27

FOREIGN PATENT DOCUMENTS

JP      2002133932 A *  5/2002

\* cited by examiner

*Primary Examiner*—Sandra O'Shea
*Assistant Examiner*—Jason Moon Han
(74) *Attorney, Agent, or Firm*—Wei Te Chung

(57) ABSTRACT

A backlight module (3) includes a light source group (31) and a light guide plate (32). The light source group includes at least a light source, and the light guide plate has a light input surface (321) for receiving light, a light output surface (322) for emitting light, which is adjacent to the light input surface, and a bottom surface opposite to the light output surface and adjacent the light input surface. The light source group faces the light input surface, which is curved such that its curvature matches with the light distribution of the light source group.

16 Claims, 5 Drawing Sheets

BACKLIGHT MODULE WITH LIGHT GUIDE PLATE HAVING CONCAVE LIGHT INPUT SURFACE

CROSS-REFERENCE TO RELATED APPLICATION

This application is a continuation, under 35 U.S.C. §120, of U.S. application Ser. No. 10/731,043, filed Dec. 8, 2003, entitled, "BACKLIGHT MODULE WITH LIGHT GUIDE PLATE HAVING CONCAVE LIGHT INPUT SURFACE", the contents of which are hereby incorporated by reference thereto.

BACKGROUND OF THE INVENTION

1. Field of the Invention

The present invention relates to a backlight module, and particularly to one used in a liquid crystal display (LCD).

2. Discussion of the Related Art

In a backlight type LCD, light beams are applied to a display member from the rear of the display member. Portions of the display member selectively allow transmission of the light beams therethrough, while other portions are opaque and prevent transmission of the light beams. The transmitted light beams are seen by an observer as displayed information. Important characteristics of the LCD include its long working lifetime, low power consumption, and brightness and uniformity of the emitted light rays. High brightness and uniform illumination help an LCD provide good display performance.

Referring to FIG. 6, a conventional backlight module 1 comprises a light source group 11 and a light guide plate 12. The light source group 11 comprises several light emitting diodes (LEDs) (not labeled). The light guide plate 12 has a light input surface 121 and a light output surface 122. Because each LED emits light over a certain range of angles, a scope of illumination 13 of the light source group 11 is the sum of the contributions of each LED's output light. Nevertheless, the illumination scope generally cannot cover the whole light guide plate 12. The hatched areas 14 in FIG. 6 show parts of the light guide plate 12 that are not illuminated. These parts are known as 'dark zones.' The existence of dark zones diminishes the performance of the backlight module 1.

Referring to FIG. 7 and FIG. 8, China Patent No. 98206129 issued on Nov. 10, 1999 discloses another kind of backlight module 2. The backlight module 2 comprises a light source group 21 and a light guide plate 22. The light source group 21 comprises three light emitting diodes (LEDs, not labeled), and the light guide plate 22 has a light input surface 221 and a light output surface 222. The light input surface 221 defines three U-shaped grooves, each matching with a corresponding LED. Thus each LED faces a concave surface of the corresponding U-shaped groove, and light beams passing through the concave surface cover a larger area of the light guide plate 22 in comparison with the above-described backlight module 1. Even so, the backlight module 2 still exhibits dark zones 24.

It is desired to provide a backlight system and a light guide plate used therein which overcome the above-described problems.

SUMMARY

An object of the present invention is to provide a backlight module which enjoys full illumination of a light guide plate thereof, there being no dark zones in the light guide plate.

To achieve the above object, a backlight module of the present invention comprises a light source group and a light guide plate. The light source group comprises a plurality of point light sources such as LEDs. The light guide plate has a light input surface for receiving light, a light output surface for emitting light, which is adjacent to the light input surface, and a bottom surface opposite to the light output surface. The light source group faces the light input surface. The light input surface is curved such that it matches a distribution of light of the light source group.

Because the light input surface matches the light distribution of the light source group, divergent light emitted from the light source group reaches the entire light input surface. Thus the light guide plate is entirely illuminated, and has no dark zones.

Other objects, advantages, and novel features of the present invention will become more apparent from the following detailed description when taken in conjunction with the accompanying drawings, in which:

DETAILED DESCRIPTION OF THE PREFERRED EMBODIMENTS

Figure 1:
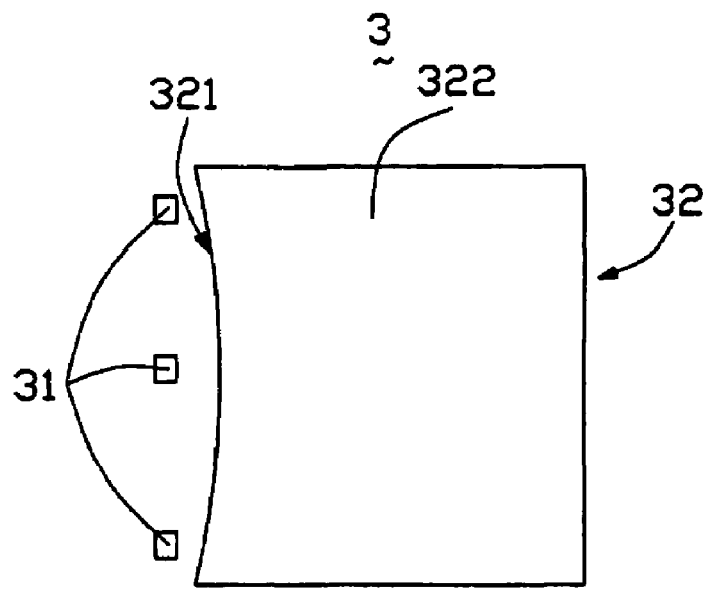
FIG. 1 is a top elevation of a backlight module according to a first embodiment of the present invention.
Figure 2:
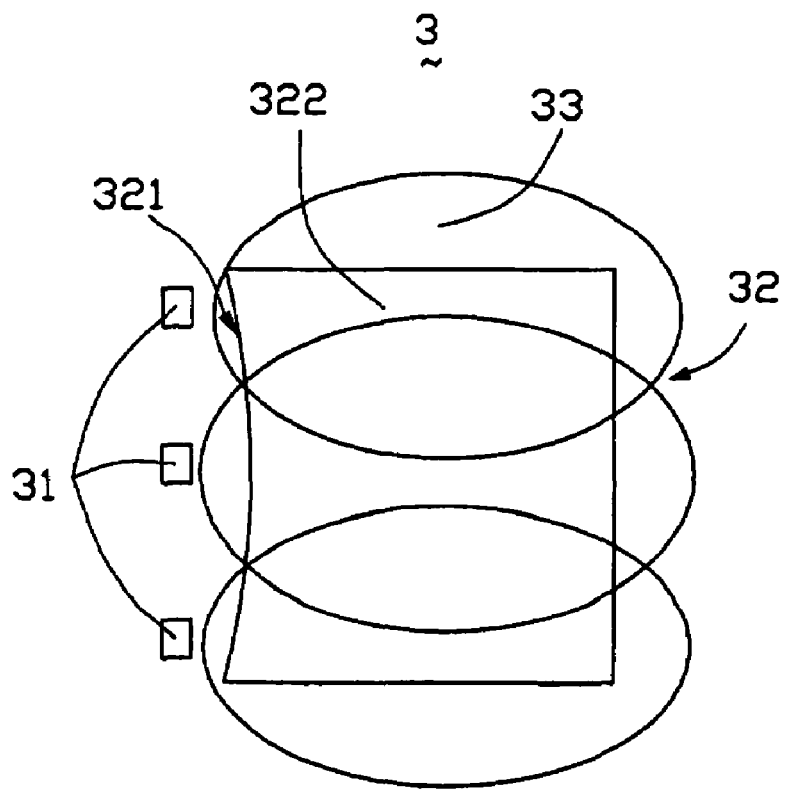
FIG. 2 is similar to FIG. 1, but schematically shows a scope of illumination of the backlight module.

Referring to FIGS. 1 and 2, a backlight module 3 according to the first embodiment of the present invention comprises a light source group 31 and a light guide plate 32. The light source group 31 comprises three point light sources such as LEDs (not labeled). The light guide plate 32 is generally parallelepiped-shaped, and has a light input surface 321 for receiving light, a light output surface 322 for emitting light, which adjacent to the light input surface 321, and a bottom surface (not shown) opposite to the light output surface 322 and adjacent the light input surface 321. The light source group 31 faces the light input surface 321. The light output surface 322 is a plane surface. The light input surface 321 is spherically concave. That is, a tap elevation of the light guide plate 32 shows the light input surface 321 having an arcuate profile (shown in FIG. 1) and a side elevation of the light guide plate 32 also shows the light input surface 321 having an arcuate profile.

The spherically concave configuration of the light input surface 321 matches an overall distribution of light emitted from the light source group 31. That is, divergent light beams emitted from the LEDs of the light source group 31 reach every part of the light input surface 321, and thus every region in the light guide plate 32. Thus a scope of illumination 33 as represented by overlapping ovals in FIG. 2 covers the whole light guide plate 32, and the light guide plate 32 has no dark zones.

Figure 3:
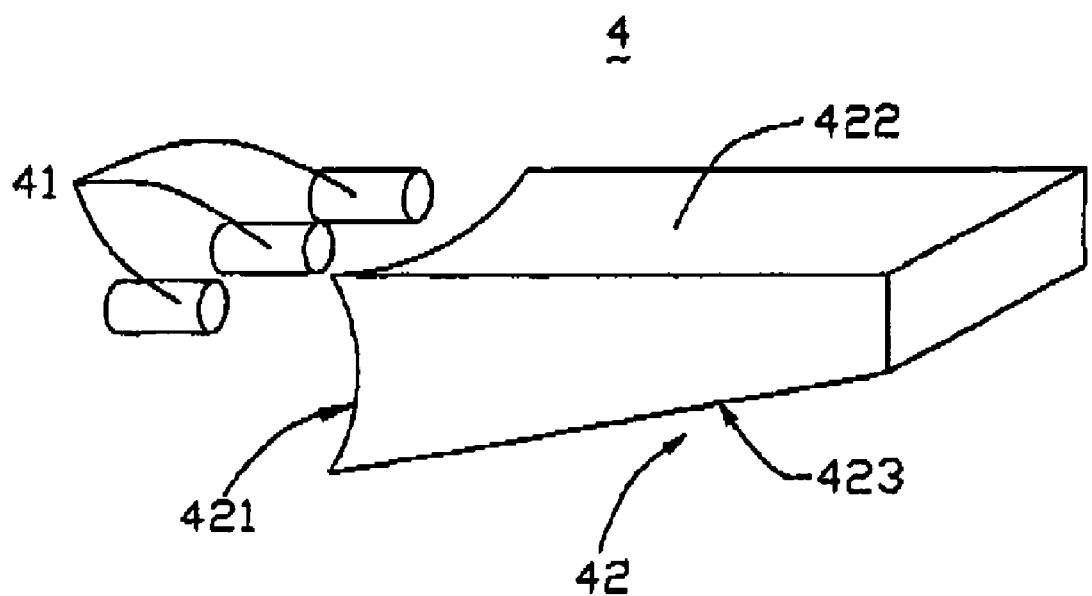
FIG. 3 is an isometric view of a backlight module according to a second embodiment of the present invention.

Referring to FIG. 3, a backlight module 4 according to a second embodiment of the present invention uses a generally wedge-shaped light guide plate 42. In other respects, the backlight module 4 is similar to the backlight module 3 of the first embodiment. The backlight module 4 further comprises a light source group 41, and the light guide plate 42 comprises a light input surface 421, a light output surface 422, which is adjacent to the light input surface 421, and a bottom surface 423 opposite to the light output surface 422 and adjacent the light input surface 421. The light input surface 421 is spherically concave, so that a curvature of the light input surface 421 matches an overall distribution of light distribution emitted from the light source group 41. Divergent light beams emitted from LEDs of the light source group 41 reach every region in the guide plate 42, so that the light guide plate 42 has no dark zones.

Figure 4:
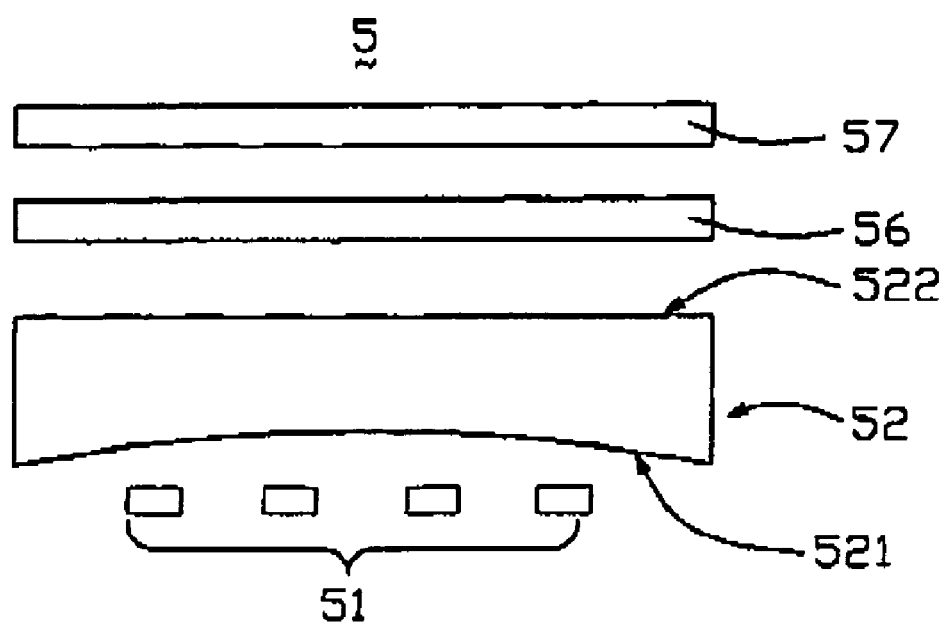
FIG. 4 is an exploded, front elevation of a backlight module according to a third embodiment of the present invention.

Referring to FIG. 4, a backlight module 5 according to a third embodiment of the present invention comprises a diffusing plate 56 and a brightness enhancing film 57, in addition to a light guide plate 52 and a light source group 51. The diffusing plate 56 is disposed between the brightness enhancing film 57 and the light guide plate 52, to receive and diffuse light beams emitted from a light output surface 522 of the light guide plate 52. The diffused light beams then enter the brightness enhancing film 57. The light guide plate 52 also has a light input surface 521 opposite to the light output surface 522, to receive light emitted from the light source group 51. The light source group 51 comprises four point light sources such as LEDs (not labeled). Unlike in the backlight modules 3, 4 of the first and second embodiments in which the light output surfaces 322, 422 are adjacent the light input surfaces 321, 421, in the backlight module 5 the light output surface 522 is opposite to the light input surface 521.

Figure 5:
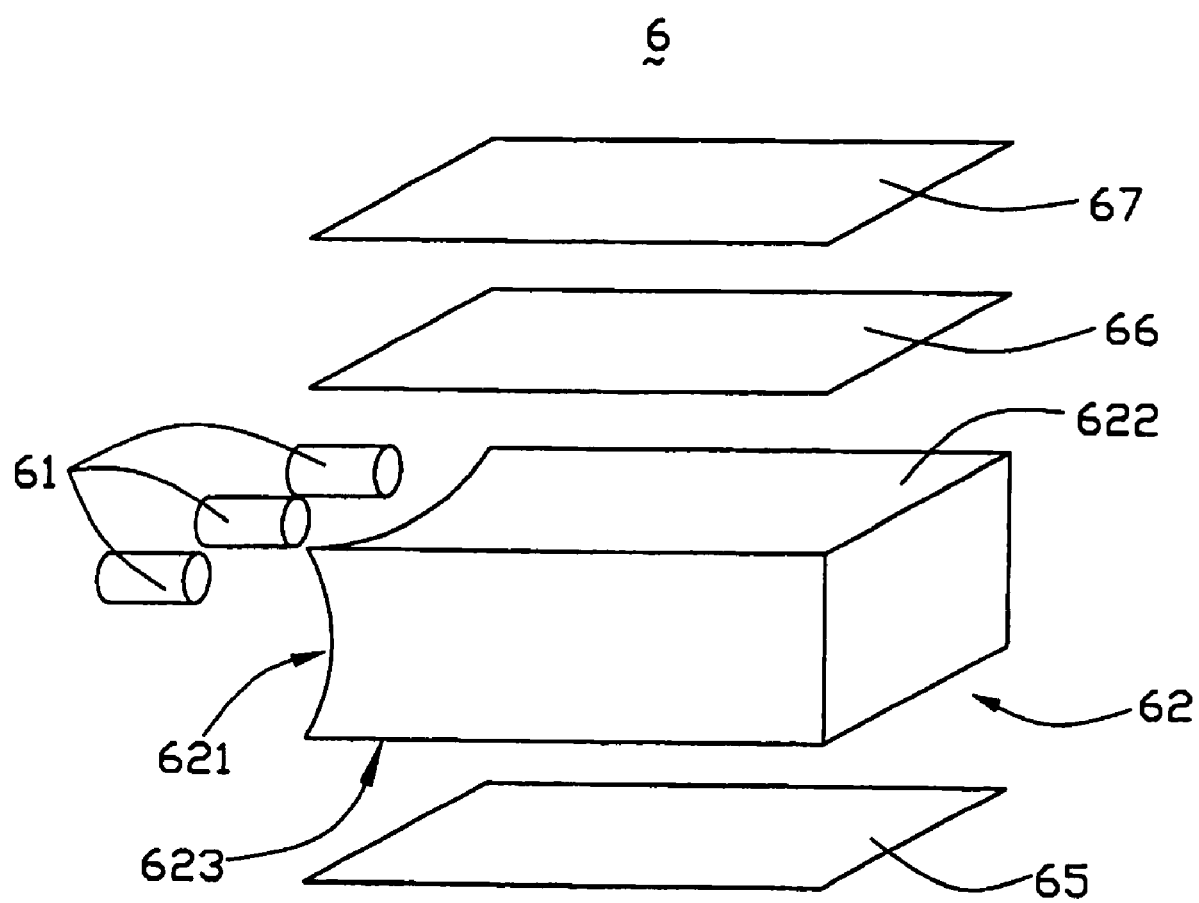
FIG. 5 is an exploded, isometric view of a backlight module according to a fourth embodiment of the present invention.
Figure 6:
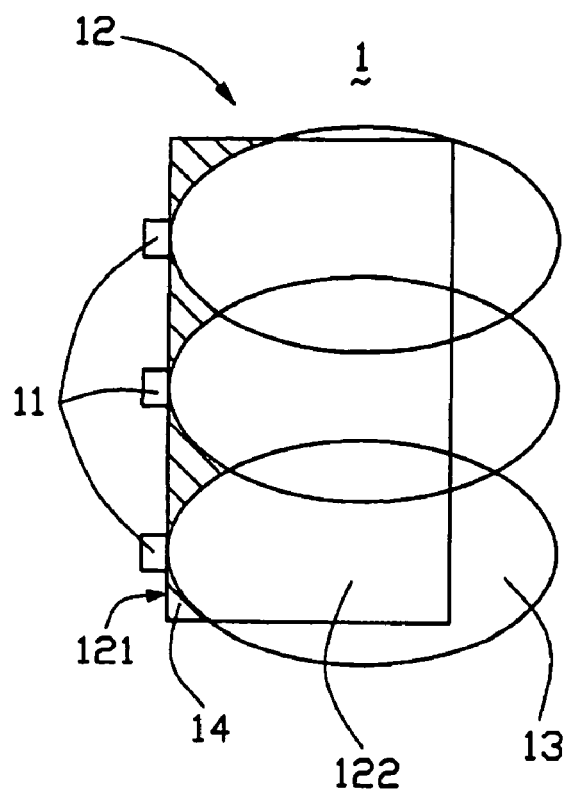
FIG. 6 is a top elevation of a conventional backlight module, schematically showing a scope of illumination thereof.
Figure 7:
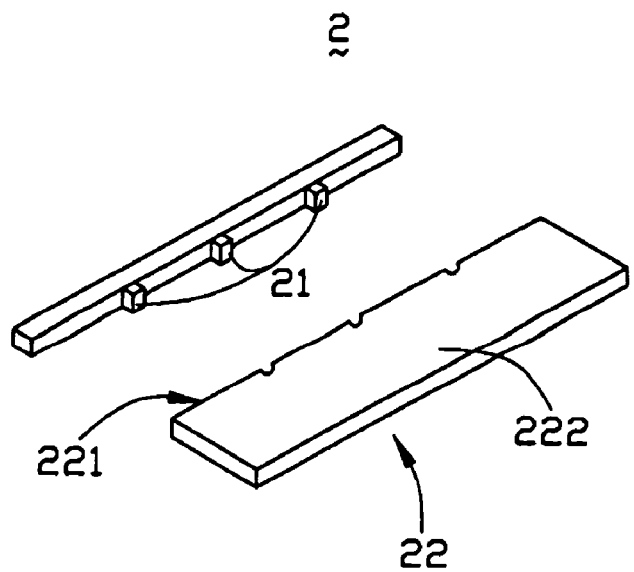
FIG. 7 is an exploded, isometric view of another conventional backlight module.
Figure 8:
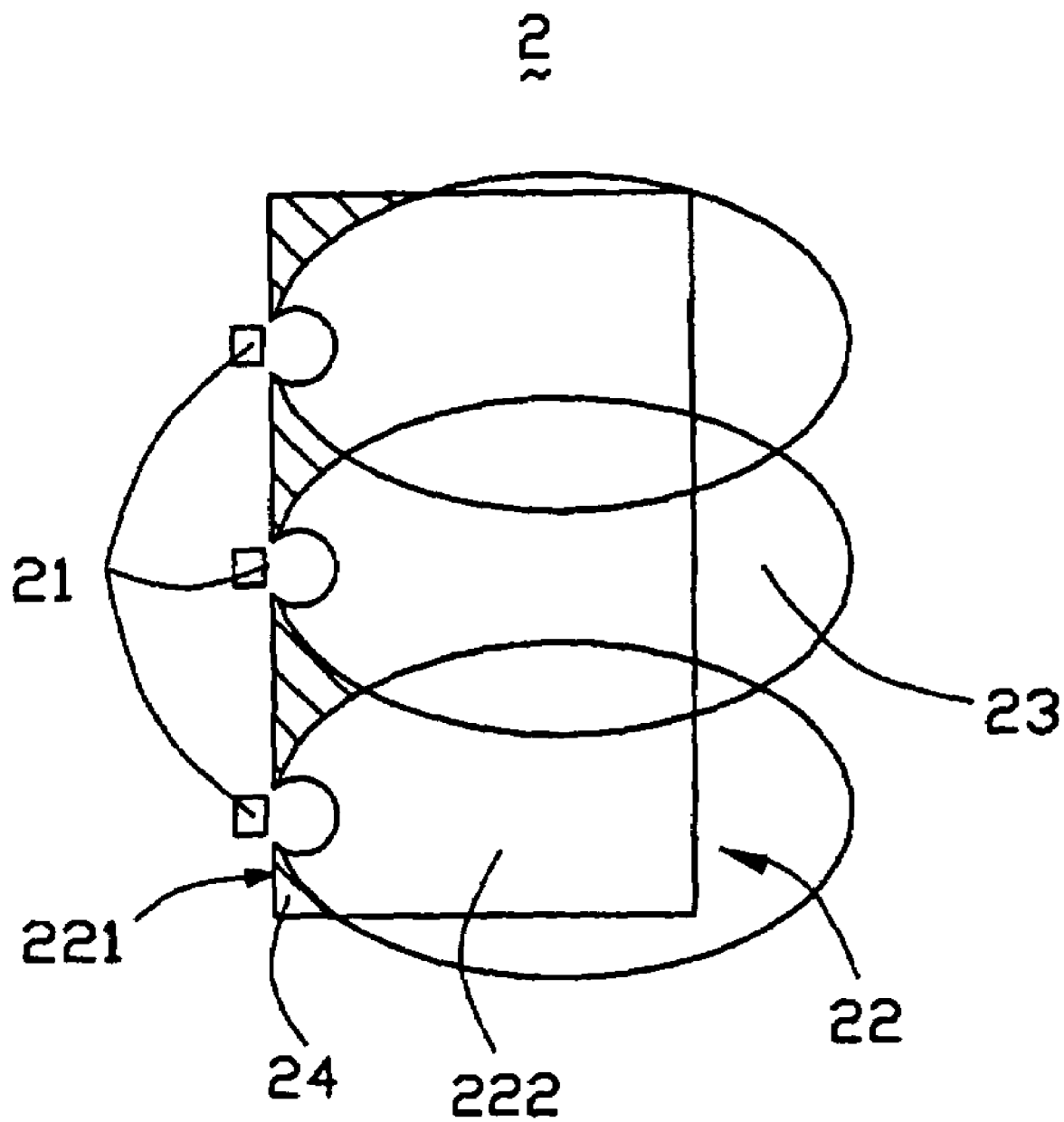
FIG. 8 is substantially an assembled, top elevation of the backlight module of FIG. 7, schematically showing a scope of illumination thereof.

Referring to FIG. 5, a blacklight module 6 according to a fourth embodiment of the present invention comprises a reflecting plate 65, a diffusing plate 66 and a brightness enhancing film 67, in addition to a light guide plate 62 and a light source group 61. The reflecting plate 65 is disposed adjacent a bottom surface 623 of the light guide plate 62, which is opposite to a top light output surface 622 of the light guide plate 62. The light output surface 622 is disposed adjacent to a light input surface 621. The diffusing plate 66 is disposed between the brightness enhancing film 67 and the light guide plate 62. The light source group 61 comprises three point light sources such as LEDs (not labeled).

As described above, each backlight module 3, 4, 5, 6 has a spherically concave light input surface 321, 421, 521, 621, whose curvature matches light distribution of the light source group 31, 41, 51, 61. In particular, each concave light input surface 321, 421, 521, 621 curves inwardly into the light guide plate 32, 42, 52, 62. Because the divergent light beams emitted from the light source group 31, 41, 51, 61 reach every part of the light input surface 321, 421, 521, 621, the whole light guide plate 32, 42, 52, 62 is illuminated and has no dark zones.

In the backlight modules 4, 5 according to the third and fourth embodiments, each of the brightness enhancing films 57, 67 can be replaced by a prism plate.

According the requirements of particular applications, the backlight module of the present invention may take forms other than the embodiments described above. For example, a linear light source may be used instead of a light source group comprising point light sources. In such case, the light input surface may be configured accordingly. In particular, instead of being spherically concave, the light input surface may be cylindrically concave. That is, a top elevation of the light guide plate shows the light input surface having a linear profile, and a side elevation of the light guide plate shows the light input surface having an arcuate profile. Still other types of light input surfaces may be configured according to need. Further, two or several light input surfaces may be employed instead of only one light input surface. Yet, another alternation may include to keep the light input surface straight while arranging the group of light sub-sources to disperse in a concave manner.

It is also to be generally understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a light source group having a plurality of point light sources; and
   a light guide plate having a light input surface for receiving light, a light output surface for emitting light, and a bottom surface opposite to the light output surface, the light output surface being adjacent to the light input surface, the light input surface being configured to be concave in an entirety thereof and to thereby curve inwardly into the light guide plate;
   wherein the light source group faces the light input surface, and the light input surface has a curvature matching a distribution of light from the light source group.

2. The backlight module as claimed in claim 1, wherein the light guide plate is generally parallelepiped-shaped.

3. The backlight module as claimed in claim 1, wherein the light guide plate is generally wedge-shaped.

4. The backlight module as claimed in claim 1, wherein the light input surface is spherically concave.

5. The backlight module as claimed in claim 1, further comprising a diffusing plate and a brightness enhancing film, the diffusing plate being disposed on the light guide plate, and the brightness enhancing film being disposed on the diffusing plate.

6. The backlight module as claimed in claim 5, wherein the brightness enhancing film is substituted by a prism plate.

7. The backlight module as claimed in claim 1, wherein the light input surface adjoins the light output surface.

8. The backlight module as claimed in claim 7, further comprising a diffusing plate and a brightness enhancing film, the diffusing plate being disposed on the light guide plate, and the brightness enhancing film being disposed on the diffusing plate.

9. The backlight module as claimed in claim 8, wherein the brightness enhancing film is substituted by a prism plate.

10. The backlight module as claimed in claim 8, further comprising a reflecting plate disposed under the light guide plate.

11. The backlight module as claimed in claim 1, wherein each light source is configured for emitting divergent light beams therefrom, the light input surface being configured for directly receiving the divergent light beams.

12. The backlight module as claimed in claim 11, wherein each light source is a LED.

13. A light module comprising:
  a light guide plate defining a light input surface for receiving light and a bottom surface adjacent to the light input surface, said light input surface essentially extending in a longitudinal direction; and
  a light source group having a plurality of spaced light sub-sources generally arranged along said longitudinal direction;
  wherein the light input surface is configured to be concave in the entirety thereof and to thereby curve inwardly into the light guide plate, and a dispersion manner of said plurality of spaced light sub-sources is configured to conform with the light input surface so as to form no dark zones in the light guide plate.

14. The light module as claimed in claim 13, wherein each tight sub-source is configured for emitting light therefrom.

15. The light module as claimed in claim 14, wherein each light sub-source is a LED.

16. A backlight module comprising:
  a light source group having a plurality of point light sources; and
  a light guide plate having a light input surface for receiving light and a light output surface for emitting light, the light input surface being configured to be one whole concave shape in an entirety thereof and to thereby curve inwardly into the light plate;
  wherein the light source group faces the light input surface, and the light input surface has an overall curvature matching a distribution of light from the light source group.

* * * * *